United States Patent [19]

Viterbo et al.

[11] 3,852,296
[45] Dec. 3, 1974

[54] MANNICH BASES OF CYCLOPENTANONES AND CYCLOPENT-2-ENONES AND PROCESS OF PREPARING THE SAME

[75] Inventors: Rene Viterbo, Paris, France; Michele Mastursi; Giulio Cesare Perri, both of Naples, Italy

[73] Assignee: Richardson-Merrell S.p.A., Naples, Italy

[22] Filed: June 5, 1972

[21] Appl. No.: 259,972

Related U.S. Application Data

[63] Continuation-in-part of Ser. No. 163,487, July 16, 1971, abandoned.

[52] U.S. Cl.... 260/247.7 K, 260/246.3, 260/514 R, 260/518 R, 260/247.2 A, 260/557 R, 260/558 A, 260/247.2 B, 260/563 R, 260/247.2 R, 260/247.7 H, 260/268 H, 260/268 R, 260/268 PH, 260/293.65, 260/293.69, 260/293.72, 260/293.76, 260/293.78, 260/293.8, 260/293.86, 260/577, 424/248, 424/315, 424/331, 424/267, 424/274, 260/295 R, 260/295 AM, 260/296 D, 260/296 R, 260/326.2, 260/326.46, 260/326.47, 260/326.5 J, 260/471 A, 260/482 R
[51] Int. Cl............................................. C07d 87/34
[58] Field of Search ... 260/247.7 K, 563 R, 326.5 J, 260/326.2, 570.5 CA, 570.5, 577, 247.2, 293.8, 471 A, 468 J, 247.7, 563, 293.65, 268 R, 471, 326.47, 468

[56] References Cited
UNITED STATES PATENTS

| | | | |
|---|---|---|---|
| 1,915,334 | 6/1933 | Salzberg et al. | 260/243 |
| 2,075,359 | 3/1937 | Salzberg et al. | 260/293.51 |
| 2,362,614 | 11/1944 | Calva | 424/325 |

OTHER PUBLICATIONS
Mannich et al. Chemical Abstracts Vol. 33 pages 3765–3766, (1939).
Ratouis et al. Chemical Abstracts Vol. 54, 2350–2351.
A. Koebner et al. J.C.S. p. 566, 567 and 570, (1941).
R. L. Frank et al. J.A.C.S. Vol. 70, pp. 1379–1381, (1948).
Winternitz et al. Bull. Soc. Chim. France pp. 316–320, (1954).

*Primary Examiner*—Joseph A. Narcavage
*Assistant Examiner*—Jose Tovar
*Attorney, Agent, or Firm*—George W. Rauchfuss, Jr.; Eugene O. Retter

[57] ABSTRACT

New 2,3-disubstituted Mannich bases of cyclopentanones and cyclopent-2-enones having the general formula:

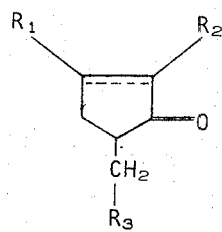

where $R_1$ and $R_2$ are each separately alkyl of 1 to 8 carbon atoms, phenyl and halogen substituted phenyl, benzyl, pyridyl, picolyl, carboxy, carboxyalkyl, carbalkoxyalkyl, carbamidoalkyl and acetomorpholide, $R_3$ is mono(lower)alkylamino, di(lower)alkylamino, monoarylamino, diarylamino, alkylarylamino, pyrrolidyl, morpholinyl, piperidyl, loweralkylpiperazinyl, arylpiperazinyl, aralkylpiperazinyl, dihydro and tetrahydropyridyl and other groups, have useful pharmacological properties, especially as cholerectic agents. The compounds are prepared by the well-known Mannich reaction from the corresponding cyclopentanones and cyclopent-2-enones.

10 Claims, No Drawings

MANNICH BASES OF CYCLOPENTANONES AND CYCLOPENT-2-ENONES AND PROCESS OF PREPARING THE SAME

This application is a continuation-in-part of our earlier copending application Ser. No. 163,487 filed July 16, 1971 and now abandoned.

BACKGROUND OF THE INVENTION

Cyclopentene and cyclopentane compounds have not been sufficiently studied from a pharmacological point of view, and only few of them are used in therapeutic practice. The study of prostagalandines and sarkomicins awoke scientific interest in cyclopentane. Some authors prepared 2-aminomethyl-cyclopentanol derivatives and the esters thereof to test them as analgesics or anti-inflammatories in pharmacological trials. Also, the related Mannich bases, 2-aminomethylcyclopentanone derivatives, were tested in pharmacological screening. The compounds of the present invention are different from those described in the prior art because of their chemical structure and pharmacological activity shown after administration to mammalians. The new compounds have 2- and 3-position both contemporaneously and independently substituted according to $R_1$ and $R_2$ definitions. Most of the compounds of the invention have double bonds between the 2- and 3-position. This fact is not present in the prior art compounds, and none of them shows a cholerectic activity which is, perhaps, the most important pharmacological property of the new compounds of this invention.

The preparation of many Mannich bases from cyclopentanones has been described in patents and in scientific literature. F. Winternitz et al. (Bull. Soc. Chem. France (1954), pages 316–320), for example, prepared 2-phenyl-5-N,N-dimethyl, aminomethyl cyclopentanone as an intermediate for other compounds, but they did not subject the intermediate to pharmacological screening. A number of 2-dialkylaminoalkyl cyclopentanones have been prepared in searches for analgesics, J. Pharm. Soc. Japan 75, 714-5, (1955) and 74 1141-4 (1954). German Pat. No. 1,059,901 describes the preparation of a number of substituted 2-aminoalkyl cyclopentanones. U.S. Pat. No. 3,269,942 of Aug. 30, 1966 describes the use of 2,2-bis(N,N-dimethylaminomethyl)cyclopentanone hydrochloride for controlling slime growth in paper pulp suspensions. F. L. Sancilio et al. studied the pharmacology of 2-(4-phenyl-1-piperazyl)methyl cyclopentanone which demonstrated analgesic and anti-inflammatory properties, Arck. Int. Pharmacodyn. 161, 28 (1966). Many other similar literature reports may be found but, insofar as we are aware, none of these have substituents on the 2- and 3-positions and have cholerectic, diuretic and other important pharmacological properties.

THE INVENTION

The new compounds of the present invention are 2,3-disubstituted Mannich bases of cyclopentanones and cyclopent-2-enones which have the following general formulas:

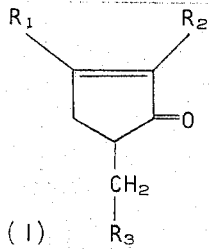

(I)

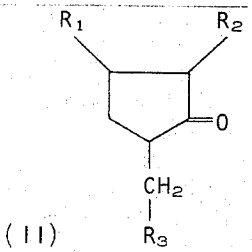

(II)

where $R_1$ and $R_2$ are each separately alkyl of 1 to 6 carbon atoms, phenyl and halogen substituted phenyl, benzyl, pyridyl, picolyl, carboxy, carboxyalkyl, carbalkoxyalkyl, carbamidoalkyl and acetomorpholide, $R_3$ is mono(lower)alkylamino, di(lower)alkylamino, monoarylamino, diarylamino, alkylarylamino, pyrrolidyl, morpholinyl, piperidyl, loweralkylpiperazinyl, arylpiperazinyl, aralkylpiperazinyl, dihydro and tetrahydropyridyl and other groups. The quaternary ammonium and the acid addition salts of the compounds are included within the scope of this invention.

The compounds of the invention are prepared in excellent yields by the well-known Mannich reaction (see F. F. Blicke, "The Mannich Reaction," in Organic Reactions, Volume 1, page 303 (1942), J. Wiley Sons, Inc.) by reacting a cyclopentanone derivative of the formula

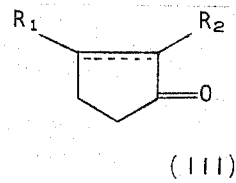

(III)

wherein $R_1$ and $R_2$ are as defined above with a suitable primary or secondary amine hydrochloride in the presence of a large proportion of formaldehyde. The reaction is carried out by dissolving the substances involved in the reaction in a water-miscible solvent acidified with a small proportion of 37 percent HCl and heating the mixture to a temperature between room temperature and the boiling point of the solvent. Generally, ethyl alcohol is used, but other organic solvents, stable under reaction conditions, such as methanol and propanol, can be used. For practical reasons, paraformaldehyde is preferred, but aqueous formaldehyde can be used.

The amines involved in the reaction are those indicated by the definition of $R_3$ above.

Many unsaturated ketone derivatives of Formula III are known and those not specifically described in the literature which are used as intermediates in the specific examples were prepared according to the methods of R. L. Frank et al., J.A.C.S. 70: 1379; (1948) and A. Koebner et al., J.C.S. 566; (1941). They give the saturated ketone derivatives by catalytic hydrogenation on 10% Pd/C.

The desired Mannich bases can be obtained from the reaction mixture either as free base or as addition salts with pharmaceutically acceptable inorganic or organic acids, such as hydrochloric, sulfuric or phosphoric acids and the like, or acetic, propionic, malonic, succinic, malic, maleic, phenylacetic acids and the like. For practical reasons, it is preferred to obtain hydrochlorides when it is possible. To obtain them it is enough to concentrate under vacuum the reaction mixture and to crystallize the residue from methanol, ethanol, acetone or other solvents. When this purification method does not give good results, the desired product may be obtained by concentrating the reaction mixture under vacuum and partitioning the residue in a little water and an organic solvent, for example, ethyl ether, benzene, toluene and the like. The organic solution is discarded. The aqueous solution is made alkaline by addition of a strong base such as NaOH, KOH, $Na_2CO_3$, $K_2CO_3$, and the like, and again extracted with an organic solvent such as ethyl ether, benzene, toluene, and the like. This last organic solution can be concentrated under vacuum or added to an organic or inorganic acid. If the solution is concentrated under vacuum, the obtained residue is distilled, and the free base may be stored for further use. To obtain additional salts of organic or inorganic acids, the free base may be dissolved in a suitable solvent, such as water, methanol, ethanol, acetone, ethyl ether and the like, and added to pharmaceutically acceptable organic or inorganic acid dissolved in water, ethanol, methanol, acetone, ethyl ether, and the like, and crystallized.

Alternatively, the organic solution may be added to a pharmaceutically acceptable organic or inorganic acid solution. The solvent and the acids are those listed above. The precipitate is collected by filtration or centrifugation and crystallized with water, methanol, acetone, ethanol or the like.

As noted above, the new compounds of the present invention are particularly useful as cholerectic agents. For instance, the compound of Example 4 described below stimulates the output of bile in rats and hamsters, both in volume and in total solids, at dosage levels of 25 and 50 mg. per kg. of body weight, more than does dehydrocholic acid at the same dosage levels. This compound also stimulates the output of bilirubine, cholesterol, bile salts and dry residue more than does dehydrocholic acid. Dehydrocholic acid stimulates the output of bile of low specific gravity.

The compounds of the present invention have a relatively low toxicity, as will be evident from the following table.

TABLE I $DL_{50}$ with confidence limits (P = 0.05) in mouse per os [1]

| Compound of Example | DL mg/kg (CL) |
|---|---|
| 1 | 355 (242 – 520) |
| 5 | 1622 (1057 – 2488) |
| 3 | 407 (263 – 631) |
| 6 | 708 (492 – 1038) |
| 2 | 1413 (955 – 2089) |
| 4 | 1230 (794 – 1905) |
| 8 | 933 (711 – 1432) |
| 9 | 2000 |
| 7 | 1862 (1214 – 2856) |
| 10 | 407 (266 – 634) |
| 11 | 933 (594 – 1466) |
| 12 | 813 (531 – 1247) |
| 13 | 1072 (647 – 1778) |
| 14 | 1413 (979 – 2021) |
| 15 | 933 (608 – 1432) |
| 16 | 933 (562 – 1548) |
| 18 | 1230 (802 – 1887) |
| 19 | >2000 |
| 26 | 813 (608 – 1431) |
| 27 | 269 (162 – 447) |
| 30 | 269 (162 – 447) |
| 31 | 155 (101 – 238) |
| 32 | 269 (162 – 447) |
| 36 | 155 (101 – 234) |

[1] Spearman - Kärber (Finney, D. J. - Statistical Method in Biological Assay, Second Edition, page 524 - Griffin and Co., Ltd. London 1964)

The cholerectic and diuretic activity of some of the compounds of the present invention, when administered to rats, is shown in the following table.

TABLE II

Cholerectic (*) and diuretic (**) Activity on Rats at a Dose of 50 mg/kg/os

| Compound of Example | % Increase in Bile Flow | % Increase Diuresis |
|---|---|---|
| 1 | 40.18 | NN |
| 5 | 12.50 | 66.35 |
| 3 | 42.61 | 61.07 |
| 6 | 20.78 | 36.27 |
| 2 | 87.44 | 109.87 |
| 4 | 86.47 | 40.03 |
| 8 | 112.95 | 70.11 |
| 9 | 22.84 | 16.54 |
| 7 | 58.76 | 67.29 |
| 11 | 106.26 | NN |
| 12 | 67.03 | NN |
| 13 | 55.37 | NN |
| 15 | 84.90 | NN |
| 16 | 126.78 | NN |
| 18 | 64.15 | NN |
| 19 | 33.34 | NN |

* Chiancone, F. Boll. Soc. Ital. Sper., 25, 676.(1949)
** Kagawa, C. M., Kalm, M. J. Arch. Int. Pharm. 137, 241.(1962)

The new compounds of the present invention also have other useful pharmacological activities as illustrated in the following table.

TABLE III

Analgesic Activity (hot plate)*; anti-inflammatory activity (Carrageenin test)**; body temperature

| Compound of Example | Dose mg/kg/os | Analgesic Time Increase % | Anti-inflammatory % Inhibition Edema |
|---|---|---|---|
| 1 | 70 | 129.50 | NN |
| 3 | 80 | 139.04 | NN |
| 2 | 280 | 117.49 | 42.22 |
| 8 | 185 | 115.96 | 49.49 |
| 9 | 400 | 142.03 | NN |
| 7 | 370 | 245.78 | 88.21 |
| 10 | 82 | 213.00 | NN |
| 19 | 400 | NN | 64.73 |

* Adami, E., Morazzi, E., Arch. Int. Pharm. 107, 322 (1956)
** Winter, C. A. et al., Proc. Soc. exper. Biol. Med., 111, 544 (1962)

The preparation of a number of compounds of the present invention will now be illustrated in the following specific examples. It will be understood that additional compounds having a structure within the scope of the general formula of the claims may be prepared in like manner using suitable intermediates.

EXAMPLE 1

2-n-propyl-3-methyl-5-dimethylaminomethyl-cyclopentanone hydrochloride

A mixture of 10.5 g. of 2-n-propyl-3-methyl-cyclopentanone, 6.12 g. of dimethylamine hydrochloride, 5.62 g. of paraformaldehyde, 0.2 ml. of concentrated HCl and 50 ml. of ethyl alcohol is refluxed and stirred. Two hours after, 2.25 g. of paraformaldehyde are added and refluxing is continued for 2 hours.

The reaction mixture is concentrated and the residue dissolved in little water is extracted with ethyl ether. The ethereal solution is washed with water, dried over anhydrous $Na_2SO_4$, filtered and acidified with gaseous HCl. The precipitate is filtered (10 g.) and crystallized from acetone. M.P. 159°–161°C.

EXAMPLE 2

2-n-propyl-3-methyl-5-N-morpholinomethyl-cyclopentanone hydrochloride

A mixture of 95 g. of 2-n-propyl-3-methyl-cyclopentanone, 83.74 g. of morpholine. HCl, 50.9 g. of paraformaldehyde, 1.8 ml. of concentrated HCl and 300 ml. of ethyl alcohol is refluxed and stirred. 2 hours after, 20.3 g. of paraformaldehyde are added and refluxing is continued for 2 hours. The reaction mixture is left to stand overnight and then concentrated under vacuum and the residue is suspended in ethyl ether. The residue obtained is filtered and washed with ethyl ether. The solution is crystallized from acetone. M.P. 152°–3°C.

This compound may also be prepared by dissolving 3 g. of the cyclopent-2-enone of Example 4 in 20 ml. EtOH and hydrogenating in the presence of 10% Pd/C and at 6 atmospheres hydrogen pressure. After 4 hours the reaction is stopped and the solution is filtered and concentrated under vacuum. The residue, dissolved in ethyl ether, is acidified with a solution of HCl in EtOH. The precipitate is collected by filtration and crystallized from acetone. It has a melting point of 151°–3°C. and the same U.V. and I.R. spectra of the compound previously prepared.

EXAMPLE 3

2-n-propyl-3-methyl-5-piperidinomethyl-cyclopentanone hydrochloride

A mixture of 21 g. of 2-n-propyl-3-methyl-cyclopentanone, 18.24 g. of piperidine hydrochloride, 11.25 g. of paraformaldehyde, 0.4 ml. of concentrated HCl and 100 ml. of ethyl alcohol is refluxed and stirred. Two hours after, 4.5 g. of paraformaldehyde are added and refluxing is continued for 2 hours.

The reaction mixture is concentrated under vacuum and 22.2 g. of product are obtained. The precipitate is crystallized from acetone. M.P. 149°–151°C.

EXAMPLE 4

2-n-propyl-3-methyl-5-N-morpholinomethyl-cyclopent-2-enone hydrochloride

A mixture of 19.5 g. of 2-n-propyl-3-methyl-cyclopent-2-enone, 17.4 g. of morpholine.HCl, 10.5 g. of paraformaldehyde, 0.35 ml. of concentrated HCl and 80 ml. of ethyl alcohol is refluxed and stirred. Two hours after, 4.23 g. of paraformaldehyde are added and refluxing is continued for 2 hours. The mixture is left to stand overnight and then concentrated under vacuum and suspended in ethyl ether, then filtered. The residue is crystallized from acetone and concentrated under vacuum. M.P. 158°–9°C.

U.V. in ethanol — $\lambda max = 238$ m$\mu$; $\epsilon = 11,800$

EXAMPLE 5

2-n-propyl-3-methyl-5-dimethylaminomethyl-cyclopent-2-enone hydrochloride

A mixture of 19.5 g. of 2-n-propyl-3-methyl-cyclopent-2-enone, 11.5 g. of dimethylamine hydrochloride, 10.5 g. of paraformaldehyde, 75 ml. of ethyl alcohol and 0.35 ml. of concentrated HCl is refluxed under stirring. Two hours after, 4.33 g. of paraformaldehyde are added and refluxing is continued for 2 hours.

The reaction mixture is concentrated under vacuum and the residue is suspended in ethyl ether. The precipitate is filtered, washed with little ethyl alcohol, and crystallized from acetone. M.P. 174°–6°C.

U.V. in ethanol — $\lambda max = 237$ m$\mu$; $\epsilon = 12,700$

EXAMPLE 6

2-n-propyl-3-methyl-5-piperidinomethyl-cyclopent-2-enone hydrochloride

A mixture of 19.5 g. of 2-n-propyl-3-methyl-cyclopent-2-enone, 17.3 g. of piperidine.HCl, 10.5 g. of paraformaldehyde, 80 ml. of ethyl alcohol and 0.35 ml. of concentrated HCl is refluxed and stirred. Two hours after, 4.23 g. of paraformaldehyde are added and refluxing is continued for 2 hours.

The reaction mixture is concentrated under vacuum and the residue is suspended in ethyl ether. The precipitate is filtered and crystallized from acetone. M.P. 165°–7°C.

U.V. in ethanol — $\lambda max = 237$ m$\mu$; $\epsilon = 12,700$

EXAMPLE 7

2-phenyl-3-methyl-5-N-morpholinomethyl-cyclopent-2-enone hydrochloride

A mixture of 25.83 g. of 2-phenyl-3-methyl-cyclopent-2-enone, 18.53 g. of morpholine.HCl, 11.25 g. of paraformaldehyde, 0.4 ml. of concentrated HCl and 100 ml. of ethyl alcohol is refluxed and stirred. Two hours after, 4.5 g. of paraformaldehyde are added and refluxing is continued for 2 hours. The reaction mixture is concentrated under vacuum and the residue dissolved in water is extracted with ethyl ether. The aqueous solution is made alkaline after cooling by adding NaOH pellets. The organic layer obtained is extracted with ethyl ether, washed with water to pH 7 and dried over anhydrous $Na_2SO_4$. Through this solution gaseous HCl is bubbled and the precipitate is crystallized from ethanol. M.P. 181°–2°C.

U.V. in ethanol — $\lambda max = 222$ m$\mu$; $\epsilon = 15,400$ $\lambda max = 251$ m$\mu$; $\epsilon = 7,350$

EXAMPLE 8

2-n-hexyl-3-methyl-5-morpholinomethyl-cyclopent-2-enone hydrochloride

A mixture of 27.1 g. of 2-n-hexyl-3-methyl-cyclopent-2-enone, 18.5 g. of morpholine hydrochloride, 11.25 g. of paraformaldehyde, 0.4 ml. of concentrated HCl and 120 ml. of ethyl alcohol is heated with refluxing. Two hours after, 4.5 g. of paraformaldehyde are added and refluxing is continued for 2 hours. The reaction mixture is concentrated under vacuum and the residue dissolved in a little water is extracted with ethyl ether. The cooled aqueous solution made alkaline with $Na_2CO_3$ powder is extracted with ethyl ether. This ethereal solution is washed with water to reach pH 7 and dried over anhydrous $Na_2SO_4$. The solvent is distilled under vacuum and the residue dissolved in ethyl ether is acidified with gaseous HCl. The hydrochloride is filtered and crystallized from acetone. M.P. 151°–3°C.

U.V. in ethanol — $\lambda max = 237$ m$\mu$; $\epsilon = 12,300$

EXAMPLE 9

2-n-hexyl-3-methyl-5-N-morpholinomethyl-cyclopentanone hydrochloride

A mixture of 27.34 g. of 2-n-hexyl-3-methyl-cyclopentanone, 18.53 g. of morpholine hydrochloride, 11.25 g. of paraformaldehyde, 0.4 ml. of concentrated HCl and 100 ml. of ethyl alcohol is refluxed and stirred.

Two hours after, 4.5 g. of paraformaldehyde are added and refluxing is continued for 2 hours. The reaction mixture is concentrated under vacuum and the residue is dissolved in a little water and then extracted with ethyl ether. After cooling, the aqueous solution is made alkaline by adding $Na_2CO_3$ powder, the oil obtained is extracted with ethyl ether and washed with water to pH 7, and then dried over anhydrous $Na_2SO_4$ and concentrated under vacuum. The residue is acidified with 6N HCl and concentrated under vacuum. The residue obtained is crystallized from acetone and concentrated under vacuum. M.P. 141°–3°C.

EXAMPLE 10

2-n-propyl-3-methyl-5-(N-methylpiperazinomethyl)-cyclopent-2-enone

A mixture of 55.28 g. of 2-n-propyl-3-methyl-cyclopent-2-enone, 76.4 g. of methylpiperazine hydrochloride. $H_2O$, 30 g. of paraformaldehyde, 1.2 ml. of concentrated HCl and 1000 ml. of ethyl alcohol is refluxed under stirring. Two hours after, 12 g. of paraformaldehyde are added and refluxing is continued for 2 hours.

The reaction mixture is concentrated under vacuum and the residue is dissolved into water and extracted with ethyl ether. The cooled aqueous solution is saturated with NaOH pellets. The organic layer obtained is extracted with ethyl ether, dried over anhydrous $Na_2SO_4$ and distilled. B.P. 114°C./0.003 mm Hg. Yield 16.3 g.

U.V. in ethanol — $\lambda max = 236\ m\mu$; $\epsilon = 11,700$

EXAMPLE 11

2-ethyl-3-methyl-5-morpholinomethyl-cyclopent-2-enone hydrochloride

A mixture of 24.8 g. of 2-ethyl-3-methyl-cyclopent-2-enone, 24.7 g. of morpholine hydrochloride, 15 g. of paraformaldehyde, 0.6 ml. of concentrated HCl and 80 ml. of ethyl alcohol is refluxed and stirred. Two hours after, 6 g. of paraformaldehyde are added and refluxing is continued for 2 hours.

The reaction mixture is concentrated under vacuum and the residue is dissolved in a little water. The aqueous solution extracted with ethyl ether is made alkaline by adding $Na_2CO_3$ powder. The organic layer is extracted with ethyl ether, washed with water to neutral pH and dried over anhydrous $Na_2SO_4$. The free base is acidified after cooling with 6N HCl and concentrated under vacuum at 60°C. The crystalline precipitate obtained is washed several times with ethyl ether. Yield 33 g. The precipitate is crystallized from methanol-acetone. M.P. 156°–7°C.

U.V. in ethanol — $\lambda max = 236\ m\mu$; $\epsilon = 13,000$

EXAMPLE 12

2-ethyl-3-methyl-5-morpholinomethyl-cyclopentanone hydrochloride

A mixture of 24.36 g. of 2-ethyl-3-methyl-cyclopentanone, 23.48 g. of morpholine hydrochloride, 14.1 g. of paraformaldehyde, 0.57 ml. of concentrated HCl and 120 ml. of ethyl alcohol is refluxed and stirred. Two hours after, 5.7 g. of paraformaldehyde are added and refluxing is continued for 2 hours.

The reaction mixture is concentrated under vacuum and the crystalline residue dissolved in a little water is extracted with ethyl ether. The ethereal solution is washed with water to pH 7, dried over anhydrous $Na_2SO_4$ and concentrated under vacuum. The residue (32.5 g.) is converted into hydrochloride by adding 6N HCl. The solution is concentrated under vacuum and the crystalline residue is suspended in ethyl ether and then filtered. The precipitate (38 g.) is crystallized from acetone. M.P. 150°–1°C.

EXAMPLE 13

2,3-dimethyl-5-morpholinomethyl-cyclopent-2-enone hydrochloride

A mixture of 22 g. of 2,3-dimethyl-cyclopent-2-enone, 15 g. of paraformaldehyde, 24.7 g. of morpholine hydrochloride, 0.6 ml. of concentrated HCl and 80 ml. of ethyl alcohol is refluxed and stirred. Two hours after, 6 g. of paraformaldehyde are added and refluxing is continued for 2 hours.

The reaction mixture is concentrated under vacuum, the crystalline residue is dissolved in a little water and extracted with ethyl ether. The aqueous solution is made alkaline by adding $Na_2CO_3$ powder; the organic layer obtained is extracted with ethyl ether, washed with water, dried over anhydrous $Na_2SO_4$ and concentrated under vacuum. The residue (34 g.) is distilled. B.P. 120°–2°/0.001 mm Hg. The free base is added of 6N HCl. The acidic solution is concentrated under vacuum and the residue is crystallized from acetone. M.P. 148°–9°C.

U.V. in ethanol — $\lambda max = 235\ m\mu$; $\epsilon = 13,100$

EXAMPLE 14

2-n-propyl-3-phenyl-5-morpholinomethyl-cyclopent-2-enone hydrochloride

A mixture of 15 g. of 2-n-propyl-3-phenyl-cyclopent-2-enone, 9.26 g. of morpholine hydrochloride, 5.62 g. of paraformaldehyde, 0.23 ml. of concentrated HCl and 100 ml. of ethyl alcohol is refluxed and stirred. Two hours after, 2.3 g. of paraformaldehyde are added and refluxing is continued for 2 hours. The reaction mixture is concentrated under vacuum and the residue dissolved in a little water is extracted with ethyl ether. The cooled aqueous solution is made alkaline by adding $Na_2CO_3$ powder, the organic layer obtained is extracted with ether to pH 7 and dried over anhydrous $Na_2SO_4$. This ethereal solution is filtered and gaseous HCl is bubbled through it. The precipitate is collected by filtration and crystallized from methanol. Yield 9.7 g.

U.V. in ethanol — $\lambda max = 219\ m\mu$; $\epsilon = 6,940$ $\lambda max = 278\ m\mu$; $\epsilon = 17,400$

EXAMPLE 15

2-ethyl-3-phenyl-5-morpholinomethyl-cyclopent-2-enone hydrochloride

A mixture of 20 g. of 2-ethyl-3-phenyl-cyclopent-2-enone, 13.2 g. of morpholine HCl, 8.02 g. of paraformaldehyde, 0.32 ml. of concentrated HCl and 100 ml. of ethyl alcohol is refluxed and stirred. Two hours after, 3.2 g. of paraformaldehyde are added and refluxing is continued for 2 hours. The reaction mixture is concentrated under vacuum, dissolved in a little water and extracted with ethyl ether. The aqueous solution is made alkaline with $Na_2CO_3$ powder and the organic layer obtained is extracted with ethyl ether, washed with water to pH 7 and dried over anhydrous $Na_2SO_4$. The solution is filtered and gaseous HCl is bubbled through it. The precipitate is collected by filtration, crystallized from methanol-acetone and dried. Yield 12 g. M.P. 156°–7°C.

U.V. in ethanol — $\lambda max = 218$ m$\mu$; $\epsilon = 8,000$ $\lambda max = 277$ m$\mu$; $\epsilon = 18,200$

EXAMPLE 16

2-benzyl-3-methyl-5-morpholinomethyl-cyclopent-2-enone hydrochloride

A mixture of 20 g. of 2-benzyl-3-methyl-cyclopent-2-enone, 13.2 g. of morpholine hydrochloride, 8.02 g. of paraformaldehyde, 0.32 ml. of concentrated HCl and 100 ml. of ethyl alcohol is refluxed and stirred. Two hours after, 3.2 g. of paraformaldehyde are added and refluxing is continued for 2 hours.

The reaction mixture is concentrated under vacuum, dissolved in a little water, and extracted with ethyl ether. The aqueous solution is made alkaline by adding $Na_2CO_3$ powder. The organic layer obtained is extracted with ethyl ether, washed to pH 7 and dried over anhydrous $Na_2SO_4$. The solution is filtered and gaseous HCl is bubbled through it. The precipitate is collected by filtration, crystallized from methanol-acetone and dried. Yield 12.6 g. M.P. 142°–3°C.

U.V. in ethanol — $\lambda max = 235$ m$\mu$; $\epsilon = 10,000$

EXAMPLE 17

2-ethyl-3-methyl-5-(N-methylpiperazinomethyl)-cyclopent-2-enone dimaleate

A mixture of 49.64 g. of 2-ethyl-3-methyl-cyclopent-2-enone, 76.4 g. of methylpiperazine . 2 HCl . $H_2O$, 30 g. of paraformaldehyde, 1.2 ml. of concentrated HCl and 1000 ml. of ethyl alcohol is refluxed under stirring. Two hours after, 12 g. of paraformaldehyde are added and refluxing is continued for 2 hours. The reaction mixture is concentrated under vacuum and dissolved in a little water, then is extracted with ethyl ether. This ethereal solution dried over anhydrous $Na_2SO_4$ is concentrated under vacuum. The residue is distilled. B.P. 112°–9°C./0.002 mm Hg 16 g. 8.63 g. of maleic acid dissolved in 100 ml. of boiling ethanol are added to the obtained basic compound dissolved in 100 ml. of ethanol. The precipitate obtained after cooling is filtered and crystallized from ethanol. Yield 10.8 g. M.P. 165°–7°C.

U.V. in ethanol — $\lambda max = 234$ m$\mu$; $\epsilon = 16,500$

EXAMPLE 18

2-methyl-3-phenyl-5-N-morpholinomethyl-cyclopent-2-enone

A mixture of 13.8 g. of 2-methyl-3-phenyl-cyclopent-2-enone, 9.89 g. of morpholine.HCl, 6 g. of paraformaldehyde, 0.24 ml. of concentrated HCl and 100 ml. of ethyl alcohol is refluxed and stirred. Two hours after, 2.4 g. of paraformaldehyde are added and refluxing is continued for 2 hours. The reaction mixture is concentrated under vacuum; the residue is dissolved in a little water and extracted with ethyl ether; the aqueous solution is made alkaline by adding $Na_2CO_3.10H_2O$ powder and is extracted with ethyl ether. The ethereal solution is washed with water to pH 7, dried over anhydrous $Na_2SO_4$ and concentrated under vacuum, and the residue is crystallized from ethanol. M.P. 76°–8°C.

U.V. in ethanol — $\lambda max = 218$ m$\mu$; $\epsilon = $ ___ $\lambda max = 278$ m$\mu$; $\epsilon = 19,500$

EXAMPLE 19

2-n-propyl-3-phenyl-5-N-morpholinomethyl-cyclopentanone hydrochloride

A mixture of 12.6 g. of 2-n-propyl-3-phenyl-cyclopentanone, 7.8 g. of morpholine hydrochloride, 4.72 g. of paraformaldehyde, 10.19 ml. of concentrated HCl and 100 ml. of ethyl alcohol is refluxed and stirred. Two hours after, 1.9 g. of paraformaldehyde are added and refluxing is continued for 2 hours. The reaction mixture is left to stand overnight at room temperature and then concentrated under vacuum. The residue is dissolved in a little water and extracted with ethyl ether. After cooling, the aqueous solution is made alkaline by adding $Na_2CO_3$ . 10 $H_2O$ powder. The organic layer obtained is extracted with ethyl ether. The ethereal solution is washed with water to pH 7 and concentrated under vacuum. Through this solution gaseous HCl is bubbled and the chloridrate obtained is crystallized from acetone-ethyl ether, then from methanol-acetone. M.P. 143°–4°C.

EXAMPLE 20

2,3-dimethyl-5-(N-methylpiperazinomethyl)-cyclopent-2-enone dimaleate

A mixture of 22 g. of 2,3-dimethyl-cyclopent-2-enone, 38.2 g. of methylpiperazine dihydrochloride, 15 g. of paraformaldehyde, 0.6 ml. of concentrated HCl and 400 ml. of ethyl alcohol is refluxed and stirred. Two hours after, 6 g. of paraformaldehyde are added and refluxing is continued for 2 hours. The reaction mixture is concentrated under vacuum and dissolved in a little water. The aqueous solution is extracted with ethyl ether and made alkaline by adding NaOH. The organic layer obtained is extracted with ethyl ether and dried over anhydrous $Na_2SO_4$. It is concentrated under vacuum and distilled. B.P. 106°–8°C./0.003 mm Hg. 4.13 g. of free base dissolved in 50 ml. of boiling ethanol are added to 4.0 g. of maleic acid dissolved in 5 ml. of boiling ethanol. The solution is cooled and the precipitate is collected by filtration and crystallized from ethanol. M.P. 171°–2°C.

U.V. in ethanol — $\lambda max = 230$ m$\mu$ ; $\epsilon = 16,900$

EXAMPLE 21

2-phenyl-3-methyl-5-dimethylaminomethyl-cyclopent-2-enone hydrochloride

A mixture of 17.22 g. of 2-phenyl-3-methyl-cyclopent-2-enone, 8.15 g. of dimethylamino HCl, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue is dissolved in a little water. The aqueous solution is extracted with ethyl ether and made alkaline by adding $Na_2CO_3$ powder.

The organic layer obtained is extracted with ethyl ether, washed with water to pH 7 and dried over anhydrous $Na_2SO_4$. The crude free base is dissolved in ethanol and gaseous HCl is bubbled through this solution. The precipitate is collected by filtration, crystallized from methanol-acetone and dried under vacuum. Yield 8.3 g.

U.V. in ethanol — λmax = 222 mμ; ε = 15,100 λmax = 253 mμ; ε = 7,200

EXAMPLE 22

2-benzyl-3-methyl-5-dimethylaminomethyl-cyclopent-2-enone hydrochloride

A mixture of 20 g. of 2-benzyl-3-methyl-cyclopent-2-enone, 8.73 g. of dimethylamine hydrochloride, 8.02 g. of paraformaldehyde, 10.32 ml. of concentrated HCl and 100 ml. of ethyl alcohol is refluxed and stirred. Two hours after, 3.21 g. of paraformaldehyde are added and refluxing is continued for 2 hours.

The reaction mixture is concentrated under vacuum and the residue, dissolved in a little water, is extracted with ethyl ether. The aqueous solution is made alkaline by adding $Na_2CO_3$ powder and extracted with ethyl ether. The ethereal solution is washed with water to neutral pH and dried over anhydrous $Na_2SO_4$ and then filtered off and gaseous HCl bubbled through it. The solution is left to stand for 4 hours and then filtered. 21 g. of the compound obtained are crystallized from methanol-acetone. M.P. 150°–1°C.

U.V. in ethanol — λmax = 218 mμ; ε = __ λmax = 335 mμ; ε = 10,856

EXAMPLE 23

2-phenyl-3-methyl-5-n-propylaminomethyl-cyclopent-2-enone hydrochloride

A mixture of 17.22 g. of 2-phenyl-3-methyl-cyclopent-2-enone, 9.55 g. of n-propylamine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and is extracted with ethyl ether. The ethereal solution is washed with water to neutral pH and is dried over anhydrous $Na_2SO_4$. Then it is filtered off and gaseous HCl is bubbled through it. The solution is left to stand for 4 hours and then filtered. 10.74 g. of the compound obtained are crystallized from methanol-acetone. M.P. 192°–3°C.

U.V. in ethanol — λmax = 222 mμ; ε = __ λmax = 254 mμ; ε = 7,330

EXAMPLE 24

2-ethyl-3-methyl-5-propylaminomethyl-cyclopent-2-enone hydrochloride

A mixture of 18.81 g. of 2-ethyl-3-methyl-cyclopent-2-enone, 14.5 g. of propylamine hydrochloride, 11.37 g. of paraformaldehyde, 0.45 ml. of concentrated HCl and 100 ml. of ethyl alcohol is refluxed and stirred. Two hours after, 4.5 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and extracted with ethyl ether. The ethereal solution is washed with water and dried over anhydrous $Na_2SO_4$ and then filtered and gaseous HCl bubbled through it. The solution is left to stand for 4 hours and then filtered. 18 g. of the compound obtained are crystallized from acetone. M.P. 148°–148.5°C.

U.V. in ethanol — λmax = 236 mμ; ε = 1,339

EXAMPLE 25

2-n-propyl-3-methyl-5-pyrrolidinomethyl-cyclopent-2-enone hydrochloride

A mixture of 20.7 g. of 2-n-propyl-3-methyl-cyclopent-2-enone, 16.14 g. of pyrrolidine hydrochloride, 11.25 g. of paraformaldehyde, 0.4 ml. of concentrated HCl and 100 ml. of ethyl alcohol is refluxed and stirred. Two hours after, 4.5 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and is extracted with ethyl ether. The ethereal solution is washed with water to pH 7 and is dried over anhydrous $Na_2SO_4$. It is then filtered and gaseous HCl is bubbled through it. The solution is left to stand for 4 hours and then filtered. 21 g. of the compound obtained are crystallized from methanol-acetone. M.P. 161°–2°C.

U.V. in ethanol — λmax = 237 mμ; ε = 1,203

EXAMPLE 26

2-n-hexyl-3-methyl-5-dimethyl-aminomethyl-cyclopent-2-enone hydrochloride

A mixture of 18.02 g. of 2-n-hexyl-3-methyl-cyclopent-2-enone, 8.15 g. of dimethylamine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and extracted with ethyl ether. The ethereal solution is washed with water to pH 7 and dried over anhydrous $Na_2SO_4$. It is then filtered and gaseous HCl is bubbled through it. The solution is left to stand for 4 hours and filtered. 20 g. of the compound obtained are crystallized from methanol-acetone. M.P. 173°–4°C.

U.V. in ethanol — λmax = 237 mμ; ε = 1,265

EXAMPLE 27

2-n-hexyl-3-methyl-5-pyrrolidinomethyl-cyclopent-2-enone hydrochloride

A mixture of 18.02 g. of 2-n-hexyl-3-methyl-cyclopent-2-enone, 10.75 g. of pyrrolidine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixtue is concentrated under vacuum; the residue obtained is crystallized from acetone-methanol. M.P. 152°–3°C.

U.V. in ethanol — λmax = 236 mμ; ε = 12,684

EXAMPLE 28

2-ethyl-3-methyl-5-pyrrolidinomethyl-cyclopent-2-enone hydrochloride

A mixture of 18.6 g. of 2-ethyl-3-methyl-cyclopent-2-enone, 16.14 g. of pyrrolidine hydrochloride, 11.25 g. of paraformaldehyde, 0.45 ml. of concentrated HCl and 100 ml. of ethyl alcohol is refluxed and stirred. Two hours after, 4.5 g. of paraformaldehyde are added and refluxing is continued for 2 hours. The reaction mixture is concentrated under vacuum and the residue obtained is crystallized from acetone. M.P. 156°–7°C.

U.V. in ethanol — λmax = 236 mμ; ε = 13,041

EXAMPLE 29

2-phenyl-3-methyl-5-diethylaminomethyl-cyclopent-2-enone methyliodide

A mixture of 20.4 g. of 2-phenyl-3-methyl-cyclopent-2-enone, 14.5 g. of diethylamine hydrochloride, 8.85 g. of paraformaldehyde, 0.36 ml. of concentrated HCl and 100 ml. of ethyl alcohol is refluxed and stirred. Two hours after, 3.6 g. of paraformaldehyde are added and refluxing is continued for 2 hours. The reaction mixture is concentrated under vacuum and the residue is dissolved in a little water. The aqueous solution is extracted with ethyl ether and the aqueous layer is made alkaline by adding $Na_2CO_3$ powder and then extracted with ethyl ether. The ethereal solution is washed with water to neutral pH, and dried over $Na_2SO_4$. After the vaporization of the solvent the residue, dissolved in 20 ml. of acetone and added to 11.9 g. of $CH_3I$, is left to stand overnight. The solution is filtered and crystallized from methanol-ethyl ether. M.P. 157°–160°C.

U.V. in ethanol — λmax = 220 mμ; ε = 25,875

EXAMPLE 30

2-benzyl-3-methyl-5-pyrrolidinomethyl-cyclopent-2-enone hydrochloride

A mixture of 18.62 g. of 2-benzyl-3-methyl-cyclopent-2-enone, 10.75 g. of pyrrolidine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and extracted with ethyl ether. The ethereal solution is washed with water to neutral pH and dried over anhydrous $Na_2SO_4$; then it is filtered and gaseous HCl is bubbled through it. The solution is left to stand for 4 hours and then filtered. 15 g. of the compound obtained are crystallized from acetone. M.P. 148°–9°C.

U.V. in ethanol — λmax = 236 mμ; ε = 10,795

EXAMPLE 31

2-ethyl-3-phenyl-5-propylaminomethyl-cyclopent-2-enone hydrochloride

A mixture of 18.62 g. of 2-ethyl-3-phenyl-cyclopent-2-enone, 9.55 g. of propylamine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue is suspended in ethyl ether. The ethereal solution is filtered and crystallized from acetone. M.P. 149°–150°C.

U.V. in ethanol — λmax = 218 mμ; ε =__ λmax = 278 mμ; ε = 18,481

EXAMPLE 32

2-ethyl-3-phenyl-5-dimethylaminomethyl-cyclopent-2-enone hydrochloride

A mixture of 18.62 g. of 2-ethyl-3-phenyl-cyclopent-2-enone, 8.15 g. of dimethylamine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue is crystallized from acetone-methanol. M.P. 139°–140°C.

U.V. in ethanol — λmax = 218 mμ; ε =__ λmax = 273 mμ; ε = 18,607

EXAMPLE 33

2-ethyl-3-phenyl-5-anilinomethyl-cyclopent-2-enone hydrochloride

A mixture of 9.49 g. of 2-ethyl-3-phenyl-5-dimethylaminomethyl-cyclopent-2-enone, 5.05 g. of aniline hydrochloride, 17 ml. of ethyl alcohol and 17 ml. of water is refluxed and stirred for 1 hour. It is left at room temperature overnight. The solution is concentrated and the residue is extracted with ethyl ether. The ethereal solution is washed with water to neutral pH and dried over $Na_2SO_4$ and then crystallized from acetone. M.P. 118°–9°C.

U.V. in ethanol — λmax = 217 mμ; ε =__ λmax = 249 mμ; ε = 18,588 λmax = 277 mμ; ε = 19,178

EXAMPLE 34

2-phenyl-3-methyl-5-pyrrolidinomethyl-cyclopent-2-enone hydrochloride

A mixture of 17.2 g. of 2-phenyl-3-methyl-2-cyclopent-2-enone, 10.75 g. of pyrrolidine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and the oil obtained is extracted with ethyl ether. The ethereal solution is washed to neutral pH, dried over anhydrous $Na_2SO_4$ and filtered. Gaseous HCl is bubbled through it and the residue is crystallized from acetone-methanol. M.P. 165°–6°C.

U.V. in ethanol — λmax = 222 mμ; ε = 15,261 λmax = 251 mμ; ε = 7,120

EXAMPLE 35

2-phenyl-3-methyl-5-piperidinomethyl-cyclopent-2-enone hydrochloride

A mixture of 17.2 g. of 2-phenyl-3-methyl-cyclopent-2-enone, 12.16 g. of piperidine hydrochloride, 7.5 g. of paraformaldehyde, 0.5 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder. The organic layer obtained is extracted with ethyl ether; the ethereal solution is washed to neutral pH and dried over anhydrous $Na_2SO_4$. Then it is filtered and gaseous HCl is bubbled through it. The precipitate is crystallized from acetone-methanol. Yield 7.7 g. M.P. 178°C.

U.V. in ethanol — λmax = 222 mμ; ε = 15,291 λmax = 250 mμ; ε = 7,095

EXAMPLE 36

2-ethyl-3-phenyl-5-pyrrolidinomethyl-cyclopent-2-enone hydrochloride

A mixture of 18.62 g. of 2-ethyl-3-phenyl-cyclopent-2-enone, 10.76 g. of pyrrolidine hydrochloride, 7.5 g. of paraformaldehyde, 0.3 ml. of concentrated HCl and 100 ml. of ethyl alcohol is refluxed and stirred. Two hours after, 3 g. of paraformaldehyde are added and refluxing is continued for 2 hours. The reaction mixture is concentrated under vacuum and the residue, dissolved in a little water, is extracted with ethyl ether. The aqueous solution is made alkaline by adding $Na_2CO_3$ powder and the organic layer obtained is extracted with ethyl ether. The ethereal solution is washed with water and dried over anhydrous $Na_2SO_4$. It is then filtered and gaseous HCl is bubbled through it. The residue is filtered and crystallized from acetone. M.P. 139°–140°C.

U.V. in ethanol — λmax = 218 mμ; ε = __ λmax = 278 mμ; ε = 18,441

EXAMPLES 37–67

By employing the appropriate cyclopentanone or cyclopent-2-enones and reacting with the appropriate primary or secondary amine hydrochloride in the presence of a large proportion of formaldehyde according to the reaction procedure of the invention, the following compounds are prepared:

TABLE IV

| Example No. | Compound Produced | M.P. °C. |
|---|---|---|
| 37 | 2-n-heptyl-3-methyl-5-[(dimethylamino)methyl]-2-cyclopenten-1-one hydrochloride | 166–167 |
| 38 | 2-phenyl-3-methyl-5-[(butylamino)methyl]-2-cyclopenten-1-one hydrochloride | 186 |
| 39 | 2-n-heptyl-3-methyl-5-[(morpholino)methyl]cyclopentan-1-one hydrochloride | 142–144 |
| 40 | 2-n-propyl-3-phenyl-5-[(pyrrolidino)methyl]-2-cyclopenten-1-one hydrochloride | 132–134 |
| 41 | 2-n-heptyl-3-methyl-5-[(n-butylamino)methyl]cyclopentan-1-one hydrochloride | 144–146 |
| 42 | 2-ethyl-3-phenyl-5-[(morpholino)methyl]-cyclopentan-1-one hydrochloride | 148–149 |
| 43 | 2-(carboethoxymethyl)-3-phenyl-5-[(n-propylamino)methyl]-2-cyclopenten-1-one hydrochloride | 143–145 |
| 44 | 2-(carboethoxymethyl)-3-phenyl-5-[(piperidino)methyl]-2-cyclopenten-1-one maleate | 135–136 |
| 45 | 2-(carboethoxymethyl)-3-phenyl-5-[(pyrrolidino)methyl]-2-cyclopenten-1-one maleate | 120–121 |
| 46 | 2-(carboethoxymethyl)-3-phenyl-5-[(pyrrolidino)methyl]-2-cyclopenten-1-one hydrochloride | 140–141.5 |
| 47 | 2-(carboethoxymethyl)-3-(p-fluorophenyl)-5-[(morpholino)methyl]-2-cyclopenten-1-one maleate | 120–121 |
| 48 | 2-(carboethoxymethyl)-3-(p-fluorophenyl)-5-[(dimethylamino)methyl]-2-cyclopenten-1-one maleate | 92–93.5 |
| 49 | 2-(carboethoxymethyl)-3-phenyl-5-[(dimethylamino)methyl]-2-cyclopenten-1-one maleate | 116.5–117.5 |
| 50 | 2-[N,N-diethylacetamide]-3-phenyl-5-](morpholino)methyl]-2-cyclopenten-1-one | 87–89 |
| 51 | 2-acetomorpholide-3-p-fluorophenyl-5-[(morpholino)methyl]-2-cyclopenten-1-one | 110–111 |
| 52 | 2-acetomorpholide-3-phenyl-5-[(morpholino)methyl]-2-cyclopenten-1-one | 109–111 |
| 53 | 2-n-butyl-3-methyl-5[(morpholino)methyl]-2-cyclopenten-1-one hydrochloride | 144–145 |
| 54 | 2-(carboethoxymethyl)-3-phenyl-5-[(morpholino)methyl]-2-cyclopenten-1-one maleate | 119–120 |
| 55 | 2-(carboethoxymethyl)-3-methyl-5-[(dimethylamino)methyl]-2-cyclopenten-1-one salicyclic acid phosphate | 108–109 |
| 56 | 2-(carboethoxymethyl)-3-methyl-5-[(morpholino)methyl]-2-cyclopenten-1-one salicyclic acid phosphate | 89–90 |
| 57 | 2-(carboethoxymethyl)-3-methyl-5-[(n-propylamino)methyl]-2-cyclopenten-1-one salicyclic acid phosphate | 106–108 |
| 58 | 2-(carboethoxymethyl)-3-methyl-5-[(piperidino)methyl]-2-cyclopenten-1-one salicyclic acid phosphate | 101.5–103 |
| 59 | 2-acetomorpholide-3-methyl-5-[(morpholino)methyl]-2-cyclopenten-1-one maleate | 116–117 |
| 60 | 2-n-butyl-3-methyl-5-[(dimethylamino)methyl]-2-cyclopenten-1-one hydrochloride | 164–165 |
| 61 | 2-n-butyl-3-methyl-5-[(pyrrolidino)methyl]-2-cyclopenten-1-one hydrochloride | 158–159 |
| 62 | 2-n-butyl-3-methyl-5-[(piperidino)methyl]-2-cyclopenten-1-one hydrochloride | 159–160 |
| 63 | 2,3-dimethyl-5-[(morpholino)methyl]cyclopentan-1-one hydrochloride | 151–153 |

TABLE IV – Continued

| Example No. | Compound Produced | M.P. °C. |
|---|---|---|
| 64 | 2-propyl-3-phenyl-5-[(propylamino)methyl]-2-cyclopenten-1-one hydrochloride | 149–150 |
| 65 | 2-ethyl-3-phenyl-5-[(piperidino)methyl]-2-cyclopenten-1-one hydrochloride | 153–154 |
| 66 | 2-n-heptyl-3-methyl-5-[(morpholino)methyl]-2-cyclopenten-1-one hydrochloride | 150–151 |
| 67 | 2-n-heptyl-3-methyl-5-[(pyrrolidino)-methyl]-2-cyclopenten-1-one hydrochloride | 156–157 |

We claim:
1. A compound having the formula

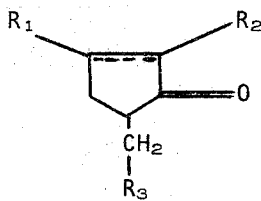

where $R_1$ and $R_2$ are each separately alkyl of 1 to 8 carbon atoms, phenyl, halophenyl, benzyl, carboethoxymethyl diethylacetamide and acetomorpholide, $R_3$ is mono(lower)alkylamino, di(lower)alkylamino, anilino, pyrrolidino, morpholino, piperidino, and (lower)alkylpiperazino wherein the alkyl portion of the (lower)alkyl radicals have 1 to 4 carbon atoms.

2. A cyclopentanone of claim 1.

3. A cyclopent-2-enone of claim 1.

4. A compound of claim 1 which is 2-n-propyl-3-methyl-5-N-morpholinomethylcyclopentanone.

5. A compound of claim 1 which is 2-n-propyl-3-methyl-5-N-morpholinomethylcyclopent-2-enone.

6. A compound of claim 1 which is 2-n-hexyl-3-methyl-5-N-morpholinomethylcyclopent-2-enone.

7. A compound of claim 1 which is 2-phenyl-3-methyl-5-N-morpholinomethylcyclopent-2-enone.

8. A compound of claim 1 which is 2-ethyl-3-methyl-5-N-morpholinomethylcyclopent-2-enone.

9. A compound of claim 2 wherein $R_3$ is morpholino.

10. A compound of claim 3 wherein $R_3$ is morpholino.

* * * * *